United States Patent
Hofmann et al.

(10) Patent No.: US 8,102,526 B2
(45) Date of Patent: Jan. 24, 2012

(54) SPECTROMETER WITH A SLIT FOR INCIDENT LIGHT AND FABRICATION OF THE SLIT

(75) Inventors: Jens Hofmann, Jena (DE); Nico Correns, Weimar (DE); Lutz Freytag, Jena (DE); Felix Kerstan, Jena (DE); Doris Jochmann, Jena (DE); Carsten Ziener, Jena (DE); Gerhard Foerschler, Pforzheim (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 112 days.

(21) Appl. No.: 12/236,889

(22) Filed: Sep. 24, 2008

(65) Prior Publication Data

US 2009/0103089 A1    Apr. 23, 2009

(30) Foreign Application Priority Data

Sep. 25, 2007 (DE) .......................... 10 2007 045 668

(51) Int. Cl.
*G01J 3/28* (2006.01)
(52) U.S. Cl. ....................................................... 356/328
(58) Field of Classification Search .................. 356/328, 356/326; 250/339.07; 850/9; 505/433
See application file for complete search history.

(56) References Cited

U.S. PATENT DOCUMENTS

| | | | |
|---|---|---|---|
| 4,562,351 A * | 12/1985 | Atherton et al. | 250/288 |
| 4,644,632 A | 2/1987 | Mächler et al. | |
| 5,750,978 A | 5/1998 | Kraiczek et al. | |
| 6,606,156 B1 | 8/2003 | Ehbets et al. | |
| 7,081,955 B2 * | 7/2006 | Teichmann et al. | 356/328 |
| 7,369,228 B2 | 5/2008 | Kerstan et al. | |
| 2004/0026614 A1 * | 2/2004 | Bateman et al. | 250/281 |

FOREIGN PATENT DOCUMENTS

| | | |
|---|---|---|
| DE | 695 02 010 T2 | 7/1998 |
| DE | 103 04 312 A1 | 8/2004 |
| DE | 10 2004 038 561 A1 | 3/2006 |
| EP | 0 194 613 A2 | 9/1986 |
| EP | 1 041 372 A1 | 4/1999 |

* cited by examiner

*Primary Examiner* — Tarifur Chowdhury
*Assistant Examiner* — Tara S Pajoohi
(74) *Attorney, Agent, or Firm* — Patterson Thuente Christensen Pedersen, P.A.

(57) ABSTRACT

A spectrometer including an entrance slit and the production of the entrance slit. The spectrometer includes a housing, an entrance slit, and an imaging diffraction grating inside the housing for splitting and imaging the light onto an optoelectric detector. The detector is arranged inside the housing. The housing and the base plate are connected to each other by mutually cooperating positioning members. The entrance slit, the positioning members of the base plate and the holding members for receiving and mounting the detecting device are integral parts of the base plate and are produced from the base plate in a precise manner, in a suitable form and in defined mutual positions by, for example, laser cutting or liquid jet cutting. The positioning members of the base plate and/or the holding members for the detecting device can be provided as resilient elements.

16 Claims, 2 Drawing Sheets

Detail A             Detail B

SPECTROMETER WITH A SLIT FOR INCIDENT LIGHT AND FABRICATION OF THE SLIT

RELATED APPLICATION

The current application claims the benefit of priority to German Patent Application No. 10 2007 045 668.0 filed on Sep. 25, 2007. Said application is incorporated by reference herein.

BACKGROUND OF THE INVENTION

The invention concerns a spectrometer comprising an entrance slit and the production of said entrance slit, and it particularly refers to a compact spectrometer, which has a miniaturized design. Such spectrometers are used in large numbers for the most diverse measurements, such as, for example, in colorimetry, routine analyses in laboratories or in industrial process measurement technology. For these reasons, it is important to provide spectrometer systems with compact measuring heads that can be inexpensively manufactured, have quick measuring times and high spectral resolution.

DE 103 04 312 A1 discloses a compact spectrometer which consists of an entrance slit, an imaging grating, detector elements arranged in the form of lines or of a matrix, and elements of control and evaluation electronics. In this case, the entrance slit and the detector elements are located on a common carrier, on whose free surfaces the control and evaluation electronics are arranged. The imaging grating is arranged in the spectrometer housing, which is connected to the carrier by auxiliary means in the form of a fixed bearing and a loose bearing for precise fitting and secure assembly.

EP 1 041 372 A1 discloses a spectrometer comprising an entrance slit for the entrance of measuring light, said entrance slit being arranged on a carrying body in the form of a housing. The carrying body is further provided with a reflection-diffracting grating and an optoelectric detecting device which is securely pre-positioned on a base plate. The carrying body and the base plate comprise mutually cooperating, mechanical positioning means for defined positioning of these parts.

The following substantial disadvantages of these prior art devices result, in particular, for serial production in large numbers.

The entrance slit is an expensive individual part. The complexity of adjustment for precise mutual positioning of the individual parts is high. A reduction of the distance between the entrance slit and the detecting device in the sense of a miniaturization of the spectrometer is subject to narrow limits.

SUMMARY OF THE INVENTION

Thus, it is an object of the invention to provide a spectrometer comprising an entrance slit, which spectrometer can be produced in an easy-to-mount and inexpensive manner even in large numbers, without very complex adjustment and with small spatial dimensions, due to a particularly advantageous design and manufacture of the base plate as well as of the entrance slit.

According to the preamble of the main claim, using the means disclosed in the characterizing part. Details of the spectrometer and of the production of the entrance slit as well as further embodiments, in particular of the entrance slit of the spectrometer, are disclosed in the dependent claims.

In connection with the design and in the sense of an economic and precise production of the entrance slit, it is advantageous for the entrance slit to be produced in the base plate by the consecutive production steps of:
  punching or cutting a tab out of the base plate and bending the tab out of the plane of the base plate;
  compressing the tab by an amount which depends on the width of the slit to be generated, and
  pressing the tab back into the plane of the base plate and, thus,
  completing the slit or opening of the entrance slit.

Further, it may be advantageous to produce the entrance slit by cutting a tab out of the base plate by laser beam cutting or by liquid jet cutting.

In the sense of an economic production, in particular in large numbers, it may be advantageous to form the entrance slit, the positioning means of the base plate and the holding means for the detecting device in precisely defined mutual positions out of the base plate in few operations by production methods using shaping technology.

Advantageous embodiments result when the tab formed out of the base plate and limiting the entrance slit has a trapezoidal, square or rectangular shape, or a shape composed of bends and straight lines.

It is further advantageous for the base plate to be made from metal or a suitable plastic material. Even the use of a base plate consisting of a ceramic material is conceivable.

BRIEF DESCRIPTION OF THE DRAWINGS

The invention will be explained in more detail below with reference to an exemplary embodiment. In the drawing.

DETAILED DESCRIPTION

Figure 1:
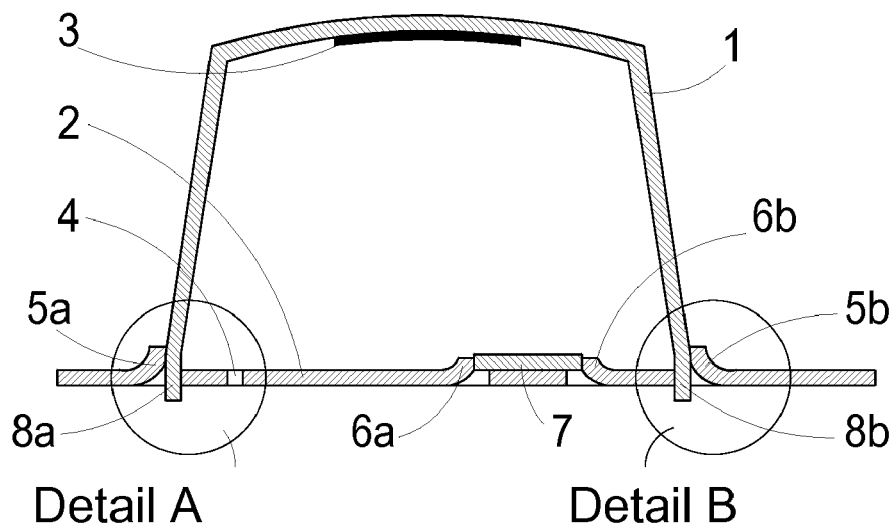
FIG. 1 shows a sectional view of a spectrometer.

FIG. 1 shows a cross-sectional view of a spectrometer having a compact design. The spectrometer consists, among others, of a housing 1, which is closed by a base plate 2. An imaging diffraction grating 3 is arranged inside the housing 1, on the internal wall of the housing 1, opposite the base plate 2. The base plate 2 is provided with an entrance slit 4, positioning means 5a; 5c and 5b; 5d as well as mounting or holding means 6a and 6b (FIG. 2), allowing the housing 1, which carries the diffraction grating 3, to be precisely positioned with respect to the base plate 2 and also allowing secure and precise reception and mounting of an optoelectronic detecting device 7 arranged on the base plate 2. The housing 1 advantageously has pins 8a; 8b arranged thereon for engagement, under tension, with the positioning means 5a; 5b, which are provided as openings or bores, and, thus, said pins 8a; 8b connect the housing 1 and the base plate 2 with each other in a precise and secure manner.

The holding means 6a; 6b for mounting the detecting device 7 to the base plate 2 are also advantageously provided as resilient pins bent out of the plane of the base plate 2. The resilient properties of the pins 8a; 8b and of the holding means 6a; 6b ensure mostly tension-free mounting of the respective parts.

Figure 2:
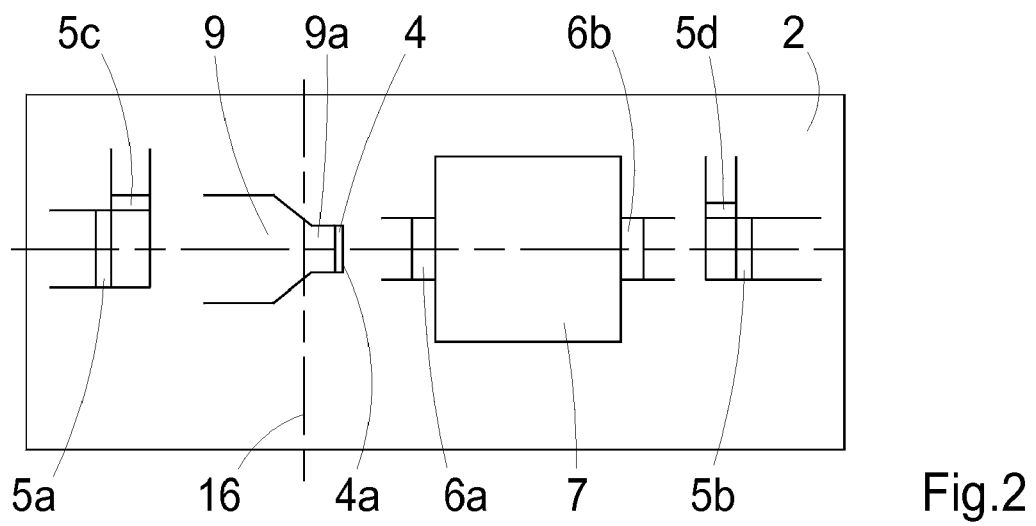
FIG. 2 shows a top view of the base plate.

In the top view of the base plate 2 shown in FIG. 2 (the housing 1 is not shown in this Figure), the entrance slit 4 is formed by an edge 4a of the base plate 2 and by an edge 9a of a tab 9 cut out of the base plate 2 with a trapezoidal cut edge.

Figure 3:
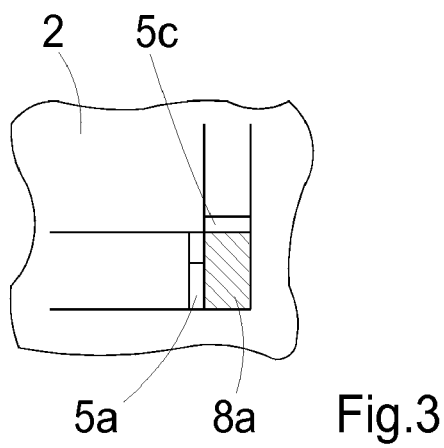
FIG. 3 shows an enlarged detail A.

FIG. 3 shows an enlarged view of the positioning means 5a and 5c, which are formed by shaping of the material of the base plate 2 and are in resilient contact with the pin 8a of the housing 1, which pin 8a is inserted in a recess of the base plate 2.

Figure 4:
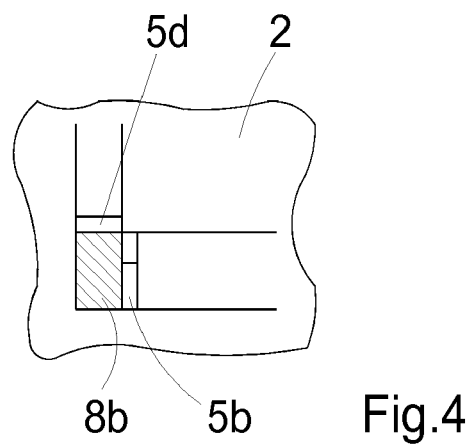
FIG. 4 shows an enlarged detail B.

FIG. 4 shows an enlarged view of the positioning means 5b and 5d, which are formed out of the material of the base plate 2 by shaping and which resiliently contact the pin 8b of the housing 1, which pin is inserted in a recess of the base plate 2.

The resilient positioning means 5a and 5b are identical in design. However, they advantageously differ in their spring constants, so that a defined mutual position of the housing 1 and base plate 2 and, thus, also of the optically effective elements of the spectrometer is maintained. Thus, the position of a neutral line 16 (FIG. 2) defined by the calculation of the optical elements is maintained for the most part even in the case of temperature changes.

Figure 5A:
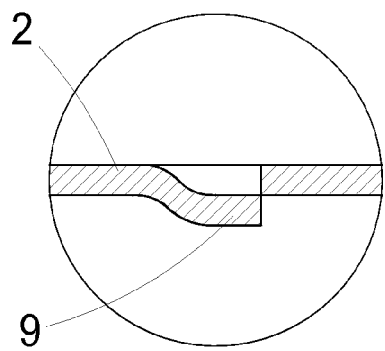
FIGS. 5a to c illustrate method steps for the production of the entrance slit.
Figure 5B:
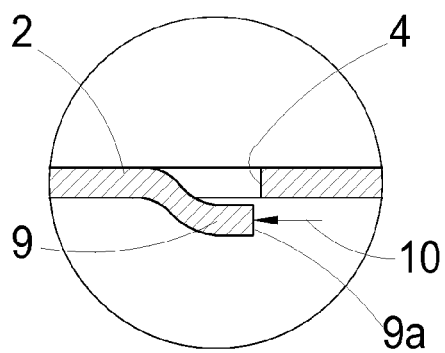
Figure 5C:
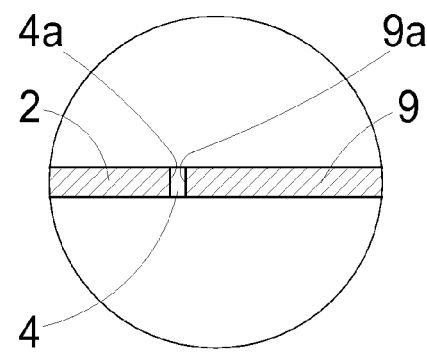

For illustration, the sectional views of the region of the base plate 2 that comprises the entrance slit 4 in FIGS. 5a to 5c show the individual method steps for producing the entrance slit 4 by shaping.

For instance, FIG. 5a shows the first method step, in which a tab 9 is punched or cut out of the base plate 2 and is bent out of the plane of the base plate 2 (in a downward direction in FIG. 5a).

In a second shaping step, which is illustrated in FIG. 5b, the tab 9 bent out of the base plate 2 is compressed in the direction of the arrow 10 by means of a tool not shown, so that the edge 4a formed in the base plate 2 by punching or cutting and the edge 9a of the tab 9 are laterally offset relative to each other by a desired amount which depends on the width of the entrance slit 4 to be generated.

The entrance slit 4 is finalized in the shaping step illustrated in FIG. 5c, in which the tab 9 bent out of the base plate 2 is bent back again into the plane of the base plate 2 by a suitable shaping tool, thereby completing the opening of the entrance slit 4.

Figure 6:
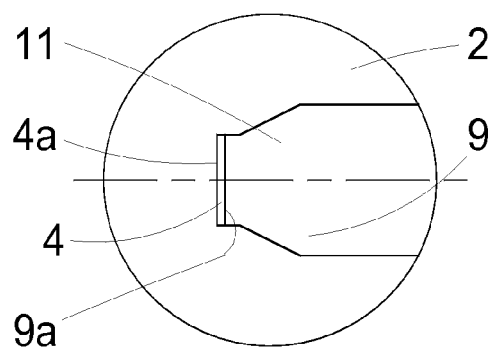
FIG. 6 shows a top view of the base plate comprising an entrance slit with a trapezoidal tongue.
Figure 7:
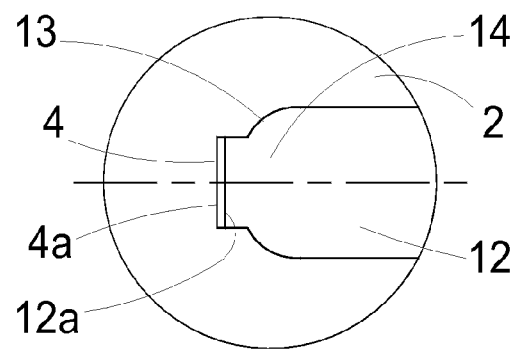
FIG. 7 shows a top view of the base plate comprising an entrance slit with a tongue consisting of straight lines and bends.
Figure 8:
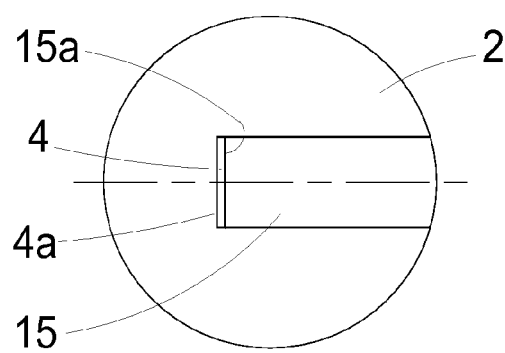
FIG. 8 shows a top view of the base plate comprising an entrance slit with a rectangular tongue.

FIGS. 6 to 8 show different cut shapes of the tab cut out of the base plate 2. For instance, FIG. 6 shows a tab 9 having a trapezoidal center bit 11.

The tab 12 shown in FIG. 7 is limited by bends 13 and straight lines, and its center bit 14 is limited by the bends 13. The opening of the entrance slit 4 is formed by the edge 4a of the base plate 2 and an edge 12a of a tab 12.

FIG. 8 shows a tab 15 with a rectangular profile. The opening of the entrance slit 4 is also formed here by the edge 4a of the base plate 2 and edge 15a of a tab 15.

Other suitable profiles for the tab of the base plate 4 are quite well-conceivable, too, such as square profiles, for example.

LIST OF REFERENCE NUMERALS 1 housing
2 base plate
3 diffraction grating
4 entrance slit
4a edge
5a; 5b positioning means
6a; 6b holding means
7 detecting device
8a; 8b pin
9 tab
9a edge
10 arrow
11 center bit
12 tab
12a edge
13 arc
14 center bit
15 tab
15a edge
16 neutral line

The invention claimed is:

1. A spectrometer, comprising:
an enclosure including a housing and a base plate;
the enclosure defining an entrance slit for entrance of measuring light;
an imaging diffraction grating arranged inside the enclosure for splitting and imaging the measuring light onto an optoelectric detecting device arranged inside the enclosure, the housing and the base plate being connected to each other by mutually cooperating positioning members for defined mutual positioning; and
the entrance slit being at least partially defined by a stamped or cut tab compressed by an amount which determines a width of the slit.

2. The spectrometer as claimed in claim 1, wherein the entrance slit, the positioning members of the base plate and holding members for receiving and mounting the detecting device are permanently integrated portions of the base plate, which are formed out of the base plate in defined relative positions and further wherein at least one of the positioning members of the base plate or the holding members for the detecting device are resilient elements.

3. The spectrometer as claimed in claim 2, wherein the entrance slit, the positioning members of the base plate and the holding members for the detecting device are produced from the base plate in precisely defined relative positions by shaping technology.

4. The spectrometer as claimed in claim 1, the entrance slit further comprising a tab limiting the entrance slit that has a trapezoidal, square or rectangular shape, or a shape composed of curves and straight lines.

5. The spectrometer as claimed in claim 1, wherein the base plate comprises metal, plastic material, or ceramic material.

6. The spectrometer as claimed in claim 1, wherein the positioning members comprise a first positioning member and a second positioning member and wherein the first positioning member has a spring constant that differs from a spring constant of the second positioning member.

7. A method of producing a spectrometer that includes a housing and a base plate comprising an entrance slit, comprising:
first, punching or cutting a tab out of the base plate;
next, bending the tab out of a plane of the base plate;
next, compressing the tab by an amount which depends on the width of the slit to be generated; and
next, pressing the tab back into the plane of the base plate thereby forming the opening of the entrance slit.

8. The method as claimed in claim 7, further comprising cutting the tab out of the base plate by laser beam cutting or by liquid jet cutting.

9. The method as claimed in claim 7, further comprising forming the entrance slit, positioning members of the base plate and holding members for a detecting device from the base plate in precisely defined relative positions by shaping technology.

10. The method as claimed in claim 7, further comprising, punching or cutting the tab out of the base plate such that the tab has a trapezoidal, square or rectangular shape, or a shape composed of bends and straight lines.

11. The method as claimed in claim 7, further comprising selecting the material from which the base plate is made from a group consisting of metal, plastic, or ceramic material.

12. The method as claimed in claim 7, further comprising forming positioning members in the base plate to receive the housing wherein the positioning members comprise at least a first positioning member and a second positioning member.

13. The method as claimed in claim 12, further comprising forming the first positioning member and the second positioning member to be resilient.

14. The method as claimed in claim 13, further comprising forming the first positioning member to have a first spring constant;
   forming the second positioning member to have a second spring constant; and
   wherein the first spring constant differs from the second spring constant.

15. The method as claimed in claim 7, further comprising forming holding members to receive and mount an optoelectric detecting device in the base plate.

16. The method as claimed in claim 7, further comprising forming at least one of the positioning members of the base plate or the holding members for the detecting device as resilient elements.

* * * * *

UNITED STATES PATENT AND TRADEMARK OFFICE
CERTIFICATE OF CORRECTION

PATENT NO. : 8,102,526 B2  Page 1 of 1
APPLICATION NO. : 12/236889
DATED : January 24, 2012
INVENTOR(S) : Jens Hofmann et al.

It is certified that error appears in the above-identified patent and that said Letters Patent is hereby corrected as shown below:

Please replace the paragraph beginning at Column 1, Line 63 and ending at Column 1, Line 67 with the following:

-- According to the invention, this object is achieved by a spectrometer constructed according to the preamble of the main claim, using the means disclosed in the characterizing part. Details of the spectrometer and of the production of the entrance slit as well as further embodiments, in particular of the entrance slit of the spectrometer, are disclosed in the dependent claims. --

Signed and Sealed this
Seventh Day of August, 2012

David J. Kappos
*Director of the United States Patent and Trademark Office*